United States Patent Office 3,297,720
Patented Jan. 10, 1967

3,297,720
SYNTHESIS OF STEROIDS
Gerald W. Krakower, Elizabeth, and Patrick A. Diassi,
Westfield, N.J., assignors, by mesne assignments, to
E. R. Squibb & Sons, Inc., New York, N.Y., a corporation of Delaware
No Drawing. Filed Sept. 16, 1964, Ser. No. 397,015
3 Claims. (Cl. 260—343.2)

This invention relates to and has as its object the provision of new physiologically active steroids, novel methods for their production and new intermediates useful in said preparation. More particularly, this invention relates to the preparation of compounds of the formula

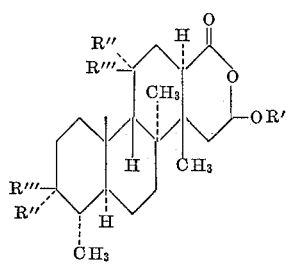

wherein R''' is hydrogen; R'' is acyloxy; and together R'' and R''' is oxo (O=); and R' is acyl.

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of this invention are physiologically active steroids which possess androgenic activity and may be used in the place of such known androgenically active steroids as testosterone in the treatment of eunuchoidism being formulated for such administration in the same manner and/or dosage as testosterone.

The final compounds of this invention may be prepared according to the processes of this invention which may be represented by the following equations wherein R', R'', and R''' are as hereinbefore defined and R may be hydrogen or lower alkyl:

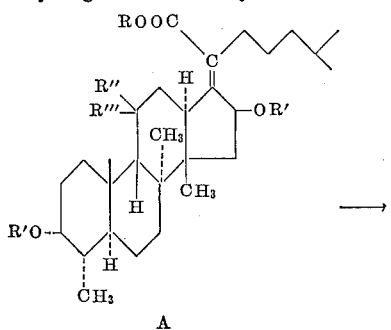

A

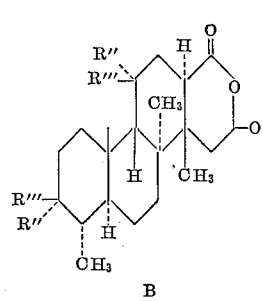

B

In the first step of the novel process of this invention, the starting material (Compounds A), for example, wherein R' is acyl and R is hydrogen, i.e., 3α,16β - diacyloxy -4α,8,14 - trimethyl - 18 - nor - 5α,8α,9β,13α,14β-17(20) - cholestene - 11 - one - 21 - oic acid is alkylated as by treatment with an alkylating agent, for example, ethereal diazomethane, to yield the 21-alkyl ester (Compounds A) wherein R is alkyl, i.e., alkyl 3α,16β - diacyloxy - 4α,8,14 - trimethyl - 18 - nor - 5α,8α,9β,13α,14β-17(20 - cholestene - 11 - one - 21 - oate, which are new compounds of the instant invention.

The 21-alkyl ester (Compounds A) may then be ozonized, as by treatment with ozone, to yield the novel D-ring lactols (Compounds B), wherein R'' is acyloxy and R' is acyl; i.e., 3α,16β - diacyloxy - 4α,8,14 - trimethyl - 17 - oxa - D - homo - 18 - nor - 5α,8α,9β,13α,14β-androstane - 11,17β - dione, which are new final products of this invention.

Alternatively, the starting material may be the 3,11-diol-21-alkyl ester (Compounds A), wherein R'' is hydroxy, R is alkyl; i.e., methyl - 16β - acyloxy - 4α,8,14-trimethyl - 18 - nor - 5α,8α,9β,13α,14β - 17(20) - cholestene - 3α,11α - diol - 21 - oate, which may be ozonized to yield the desired D-ring lactols (Compounds B) i.e., 16β - acyloxy - 4α,8,14 - trimethyl - 17 - oxa - D - homo-18 - nor - 5α,8α,9β,13α,14β - androstane - 3,11,17α-trione, which are also new final products of this invention.

The starting material employed in the practice of the instant invention may be prepared in accordance with the teachings found in Tetrahedron (1962), volume 18, pages 1029 to 1049; Pergammon Press Ltd., printed in Northern Ireland. See specifically the preparation of Compound 7 at page 1041 and the preparation of Compound 28 at page 1046. Explanation and clarification of the structural formulas of the compounds prepared in the Tetrahedron article may be found in Experentia (1963), volume 19, pages 521 and 522, and Experentia (1964), volume 20, pages 344 to 347.

The invention may be further illustrated by the following examples:

EXAMPLE 1

*Methyl 3α,16β-diacetoxy-4α,8,14-trimethyl-18-nor-17(20)-5α,8α,9β,13α,14β-cholestene-11-one-21-oate*

A solution of 3α,16β - diacetoxy - 4α,8,14 - trimethyl-18 - nor-17(20) - 5α,8α,9β,13α,14β - cholestene - 11 - one-21-oic acid in ether is treated with excess ethereal diazomethane. After evaporation of the solvent, the resulting residue is crystallized from acetone-hexane to give methyl 3α,16β - diacetoxy - 4α,8,14 - trimethyl - 18 - nor - 17(20)-5α,8α,9β,13α,14β - cholestene - 11 - one - 21 - oate, M.P. 123–124° C. $[\alpha]_D^{29}+38°$.

*Analysis.*—Calc'd for $C_{34}H_{52}O_7$: C, 71.29; H, 9.15. Found: D, 71.28; H, 9.18.

EXAMPLE 2

*3α,16β-diacetoxy-4α,8,14-trimethyl-17-oxa-d-homo-18-nor-5α,8α,9β,13α,14β-androstane-11,17α-dione*

A stream of oxygen-ozone mixture is passed through a solution of 5.72 g. of methyl 3α,16β - diacetoxy-4α,8,14 -trimethyl - 18 - nor - 17(20) - 5α,8α,9β,13α,14β-cholestene-11-one-21-oate in 125 ml. of acetic acid. The solution is kept below 10° C. and a total of 110 moles of ozone are passed through in five minutes. The solution is kept at room temperature for one hour with helium bubbling through and the acetic acid is then evaporated. Trituration of the resulting yellow oil with hexane-ether gives 2.35 g. of white crystalline material, M.P. 207–213° C. Recrystallization from ether gives 1.818 g. of 3α,16β - diacetoxy - 4α,8,14 - trimethyl - 17- oxa - D - homo - 18 - nor - 5α,8α,9β,13α,14β-androstane-11,17a-dione, M.P. 214–217° C. The analytical sample recrystallized from methanol has M.P. 218–219° C. [α]$_D^{29}$—31.4°; NMR (CDCl$_3$)—triplet at 3.54τ J=6.5, 7 (1 H), singlet at 7.86τ (3 H), singlet at 7.93τ (3 H); λKBr 1700, 1730, 1765, 1780 cm.$^{-1}$.

Analysis.—Calc'd for C$_{25}$H$_{36}$O$_7$: C, 66.9; H, 8.09; CH$_3$CO, 19.19. Found: C, 67.09; H, 8.26; CH$_3$CO, 19.78; C, 66.85; H, 7.90.

EXAMPLE 3

*3α,16β-diacetoxy-4α,8,14-trimethyl-17-oxa-D-homo-18-nor-5α,8α,9β,13α,14β-androstane-11,17a-dione*

A solution of 5.92 g. of methyl 3α,16β-diacetoxy-4α, 8,14 - trimethyl - 18 - nor - 17(20)-5α,8α,9β,13α,14β-cholestene-11-one-21-oate in 250 ml. of methylene chloride containing 2.5 ml. of pyridine is cooled to —70° C. A stream of oxygen-ozone containing 50 mmoles of ozone is passed through this solution during 40 minutes. After warming to room temperature the solution is treated with zinc and acetic acid. The solution is filtered, washed with water, sodium bicarbonate solution, water, dried and evaporated. From this brown viscous oil on recrystallization with ether, 261 mg. of 3α,16βdiacetoxy-4α,8,14-trimethyl - 17 - oxa-D-homo-18-nor-5α,8α,9β,13α,14β-androstane-11,17a-dione, M.P. 209–211° are obtained. The infrared spectrum of this material is identical with that of the material obtained in Example 2 above.

EXAMPLE 4

*16β-acetoxy-4α,8,14-trimethyl-71-oxa-D-homo-18-nor-5α,8α,9β,13α,14β-androstane-3,11,17a-trione*

Following the procedure of Example 2, but substituting methyl 16β - acetoxy-4α,8,14-trimethyl-18-nor-17(20)-5α, 8α,9β,13α,14β-cholestene - 3α,11α - diol - 21 - oate for the methyl 3α,16β - diacetoxy - 4α,8,14 - trimethyl - 18-nor-17 (20)-5α,8α,9β-13α,14β-cholestene-11-one 21-oate, there is obtained 16β - acetoxy - 4α,8,14 - trimethyl - 17-oxa-D-homo-18-nor - 5α,8α,9β,13α,14β - androstane - 3,11,17a-trione, M.P. 246–249° C.; NMR (CDCl$_3$) triplet at 3.54τ J=5, 7.5 (1 H), singlet at 7.84τ (3 H).

Analysis.—Calc'd for C$_{23}$H$_{32}$O$_6$: C, 68.29; H, 7.97. Found: C, 68.50; H, 7.79.

The invention may be variously otherwise embodied within the scope of the appended claims.

What is claimed is:
1. A compound of the formula

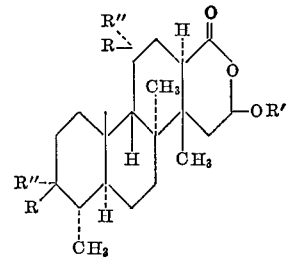

wherein R is hydrogen; R″ is acyloxy wherein the acyl radical is of a hydrocarbon carboxylic acid of less than twelve carbon atoms; and together R and R″ is oxo (O=); and R′ is acyl, wherein the acyl radical is of a hydrocarbon carboxylic acid of less than twelve carbon atoms.

2. 3α,16β-diacetoxy - 4α,8,14 - trimethyl - 17 - oxa-D-homo-18-nor-5α,8α,9β,13α,14β-androstane-11,17a-dione.

3. 16β-acetoxy-4α,8,14-trimethyl-17-oxa - D - homo-18-nor-5α,8α,9β,13α,14β-androstane-3,11,17a-trione.

References Cited by the Examiner

Godtfredsen et al.: Tetrahedron, vol. 18 (1962) pages 1039–1048.

Arigoni et al.:; I. Experientia, vol. 19, (10–15–1963) pp. 521–3.

Arigoni et al.: II Experientia, vol. 20, (6–15–1964) pp. 344–7.

WALTER A. MODANCE, *Primary Examiner.*

J. A. PATTEN, *Assistant Examiner.*